US012631919B2

(12) United States Patent
Lin et al.

(10) Patent No.: US 12,631,919 B2
(45) Date of Patent: May 19, 2026

(54) SYMMETRICAL LIGHT BAR LAYOUT FOR AUDIO/VISUAL DEVICE

(71) Applicant: Roku, Inc., San Jose, CA (US)

(72) Inventors: Yi-Fan Lin, Zhubei City (TW); Chun-Yu Kuan, New Taipei City (TW); Chung-Yi Chiu, Zhubei City (TW); Steve Shaw-Jong Liu, Mountain View, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/762,262

(22) Filed: Jul. 2, 2024

(65) Prior Publication Data

US 2026/0010036 A1 Jan. 8, 2026

(51) Int. Cl.
*G02F 1/00* (2006.01)
*G02F 1/1335* (2006.01)
*G02F 1/13357* (2006.01)

(52) U.S. Cl.
CPC .. *G02F 1/133612* (2021.01); *G02F 1/133603* (2013.01)

(58) Field of Classification Search
None
See application file for complete search history.

(56) References Cited

U.S. PATENT DOCUMENTS

| | | | |
|---|---|---|---|
| 10,706,770 B2 * | 7/2020 | Hall | G06F 3/1446 |
| 2008/0037284 A1 * | 2/2008 | Rudisill | F21V 23/06 |
| | | | 362/629 |

| | | | |
|---|---|---|---|
| 2009/0207633 A1 | 8/2009 | Ye et al. | |
| 2009/0310335 A1 * | 12/2009 | Park | H05K 1/11 |
| | | | 362/234 |
| 2013/0127879 A1 * | 5/2013 | Burns | G01L 19/0084 |
| | | | 29/729 |
| 2015/0167948 A1 * | 6/2015 | Wasserman | F21S 8/03 |
| | | | 362/249.01 |

(Continued)

FOREIGN PATENT DOCUMENTS

| | | |
|---|---|---|
| CN | 113129843 A | 7/2021 |
| KR | 10-2011-0044663 A | 4/2011 |
| TW | M529938 U | 10/2016 |

OTHER PUBLICATIONS

International Search Report and Written Opinion for International Application No. PCT/US2025/023368, mailed on Jul. 22, 2025, 10 pages.

(Continued)

*Primary Examiner* — Gerald J Sufleta, II
(74) *Attorney, Agent, or Firm* — Sterne, Kessler, Goldstein & Fox P.L.L.C.

(57) ABSTRACT

The present disclosure describes devices, components, connectors, and cables that provide backlight for a display screen. Some embodiments describe a light-emitting diode (LED) bar or a plurality of LED bars. The LED bars can include a communications port on a first end of each LED bar that is configured to receive a driving voltage, data signals, and/or some combination of power and data from a control source. The LED bars can include a power port on a second end of each LED bar that is configured to receive power from a power source. The light bars can be arranged substantially parallel to one another and in a matching orientation.

20 Claims, 9 Drawing Sheets

(56) References Cited

U.S. PATENT DOCUMENTS

| 2015/0237424 | A1* | 8/2015 | Wilker | H04R 3/04 |
| | | | | 381/150 |
| 2020/0116315 | A1 | 4/2020 | Zhao | |
| 2020/0286422 | A1* | 9/2020 | Cho | G09G 3/32 |
| 2022/0365394 | A1 | 11/2022 | Chen et al. | |
| 2024/0170628 | A1 | 5/2024 | Liu et al. | |

OTHER PUBLICATIONS

Office Action, dated Jan. 30, 2026, for Taiwan Patent Application No. 114113025, 28 pages including English translation.

\* cited by examiner

Media Device 104

Media Device 204

Frame 250

LCD Screen
252

Media Device 304

Frame 350

352
362
364

900

Dispose a first light-emitting diode (LED) bar adjacent to a first portion of a display screen in a first orientation
910

↓

Dispose at least a second LED bar adjacent to a second portion of the LCD screen in the first orientation and substantially parallel to the first LED bar
920

↓

Dispose a communication cable adjacent to a proximal end of the first LED bar and the at least second LED bar
930

↓

Connect the communication cable to a control source
940

↓

Dispose a power cable adjacent to a distal end of the first LED bar and the at least second LED bar
950

↓

Connect the power cable to the control source
960

↓

Connect the power cable to a power in port disposed on the media device
970

FIG. 9

1000

Dispose a first light-emitting diode (LED) bar adjacent to a first portion of a display screen in a first orientation, the first orientation having a communication port disposed at a proximal end of the LED bar and a power port disposed at a distal end of the LED bar
1010

Dispose at least a second LED bar adjacent to a second portion of the LCD screen in the first orientation and substantially parallel to the first LED bar
1020

Connect a communication cable adjacent to the communication port of the first LED bar and the at least second LED bar
1030

Connect a power cable to the power port of the first LED bar and the at least second LED bar
1040

FIG. 10

SYMMETRICAL LIGHT BAR LAYOUT FOR AUDIO/VISUAL DEVICE

FIELD

This disclosure generally relates to audio-visual devices that are configured to display video, and more particularly to backlight for a display screen.

BRIEF SUMMARY

Various embodiments of the disclosure relate to devices, connectors, and cables that provide a media device. In some embodiments, the media device can include a display screen and a backlight apparatus. In some embodiments, the back-light apparatus can include a first light-emitting diode (LED) bar that can include a first communications port disposed at a proximal end of the first LED bar and a first power port disposed at a distal end of the first LED bar. The backlight apparatus can further include a second LED bar disposed substantially parallel to the first LED bar, where the second LED bar can include a second communications port disposed at a proximal end of the second LED bar and a second power port disposed at a distal end of the LED bar. The first LED bar and the second LED bar are disposed in a similar orientation. The backlight apparatus can further include a power cable coupled to the first power port and the second power port and a communications cable coupled to the first and the second communications ports. The backlight apparatus can further include a control circuit board coupled to the communications cable.

In some embodiments, the first communications port and the second communications port can include a data-in connection, a driving voltage input connection, a ground connection, a driving voltage output connection, and/or a data-out connection.

In some embodiments, the data-in connection and the data-out connection can be coupled using data transmission circuitry embedded within the first LED bar and the second LED bar.

In some embodiments, the driving voltage input connection and the driving voltage output connection are coupled using electrical transmission circuitry embedded within the first LED bar and the second LED bar.

In some embodiments, the first LED bar and the second LED bar can include at least one integrated circuit (IC) control device coupled to the data transmission circuitry, and the IC control device can include an active matrix (AM) display driver.

In some embodiments, the backlight apparatus can further include a plurality of LED bars that can include a quantity of LED bars determined as a function of a size of the display screen.

In some embodiments, the plurality of LED bars are disposed having their respective communications ports on a respective proximal end of each LED bar of the plurality of LED bars and their respective power ports on a respective distal end of each LED bar of the plurality of LED bars from the communications cable.

In some embodiments, the communications cable can be a flat polymer cable. That can include a first data transmission line, a first driving voltage line, a ground line, a second driving voltage line, and a second data transmission line.

Some embodiments of the disclosure also relate to a backlight apparatus. In some embodiments, the backlight apparatus can include a first light-emitting diode (LED) bar that can include a first communications port disposed at a proximal end of the first LED bar and a first power port disposed at a distal end of the first LED bar. The backlight apparatus can further include a second LED bar disposed substantially parallel to the first LED bar, where the second LED bar can include a second communications port disposed at a proximal end of the second LED bar and a second power port disposed at a distal end of the LED bar. The first LED bar and the second LED bar are disposed in a similar orientation. In some embodiments, the backlight apparatus can further include a power cable coupled to the first power port and the second power port, a communications cable coupled to the first and the second communications port, and/or a control circuit board coupled to the communications cable.

Some embodiments of the present disclosures also relate to a method of manufacturing a media device. In some embodiments, the method of manufacture can include disposing a first light-emitting diode (LED) bar adjacent to a first portion of a display screen in a first orientation, disposing at least a second LED bar adjacent to a second portion of the display screen in the first orientation and substantially parallel to the first LED bar (the first LED bar and the second LED bar are separated by a predetermined distance). The method can further include disposing a communications cable adjacent to a proximal end of the first LED bar and a proximal end of the second LED bar (the communications cable can be coupled to a first communications port disposed at the proximal end of the first LED bar and a second communications port disposed at the proximal end of the second LED bar) and connecting the communications cable to a control source, disposing a power cable adjacent to a distal end of the first LED bar and a distal end of the second LED bar (the power cable can be coupled to a first power port disposed at the distal end of the first LED bar and a second power port disposed on the distal end of the second LED bar). The method can further include connecting the power cable to the control source, and connecting the power cable to a power-in port disposed on the media device.

In some embodiments, the method can further include disposing at least a first integrated circuit (IC) control device on the first LED bar and the second LED bar and connecting the at least first IC control device to the communications cable using a communications circuit embedded within the first LED bar and the second LED bar.

In some embodiments, the method can further include connecting the first IC control device to a first LED on the first LED bar and to a first LED on the second LED bar.

In some embodiments, the method can further include controlling an activation, a brightness, and an activation time of the first LED on the first LED bar and the first LED on the second LED bar using an active matrix driver embedded in the control source coupled to the communication line coupled to the LED bar. In some embodiments, the method can further include connecting the LED bar to a ground.

BRIEF DESCRIPTION OF THE DRAWINGS/FIGURES

The accompanying drawings are incorporated herein and form a part of the specification.

FIG. 9 is a flowchart depicting a method of manufacturing a backlight apparatus, according to some embodiments.

FIG. 10 is a flowchart depicting a method of manufacturing a backlight apparatus, according to some embodiments.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for providing backlight for a display screen.

Audio/visual (A/V) device manufacturing, particularly devices that require a backlight for, e.g., a liquid crystal display (LCD) screen, can employ a daisy-chain configuration to interconnect a series of light bars for the backlight. In some cases, the light bar includes a single input port on one end of the light bar to connect power, data input, driving voltage input for the light source (e.g., a light-emitting diode (LED), driver integrated circuits (ICs) (also referred to herein as IC devices), or the like), a ground connection, a driving voltage output connection, and a data output connection. Additionally, the light bars are often installed in a head-to-tail configuration, where the input port of the first light bar is positioned at the bottom of the display screen, and the input port of the next light bar is positioned at the top of the display screen, and so on. This configuration creates risk. First, a light bar installed incorrectly can slow the manufacturing process and possibly damage the A/V device. Second, if the power input and the driving voltage input are switched, the device can undergo significant electrical damage. Thus, there exists a need to streamline manufacturing and mitigate electrical damage.

Various embodiments of this disclosure may be implemented using and/or may be part of a multimedia environment 100 shown in FIG. 1. It is noted, however, that multimedia environment 100 is provided solely for illustrative purposes, and is not limiting. Embodiments of this disclosure may be implemented using and/or may be part of environments different from and/or in addition to the multimedia environment 100, as will be appreciated by persons skilled in the relevant art(s) based on the teachings contained herein. An example of the multimedia environment 100 shall now be described.

Multimedia Environment

Figure 1A:
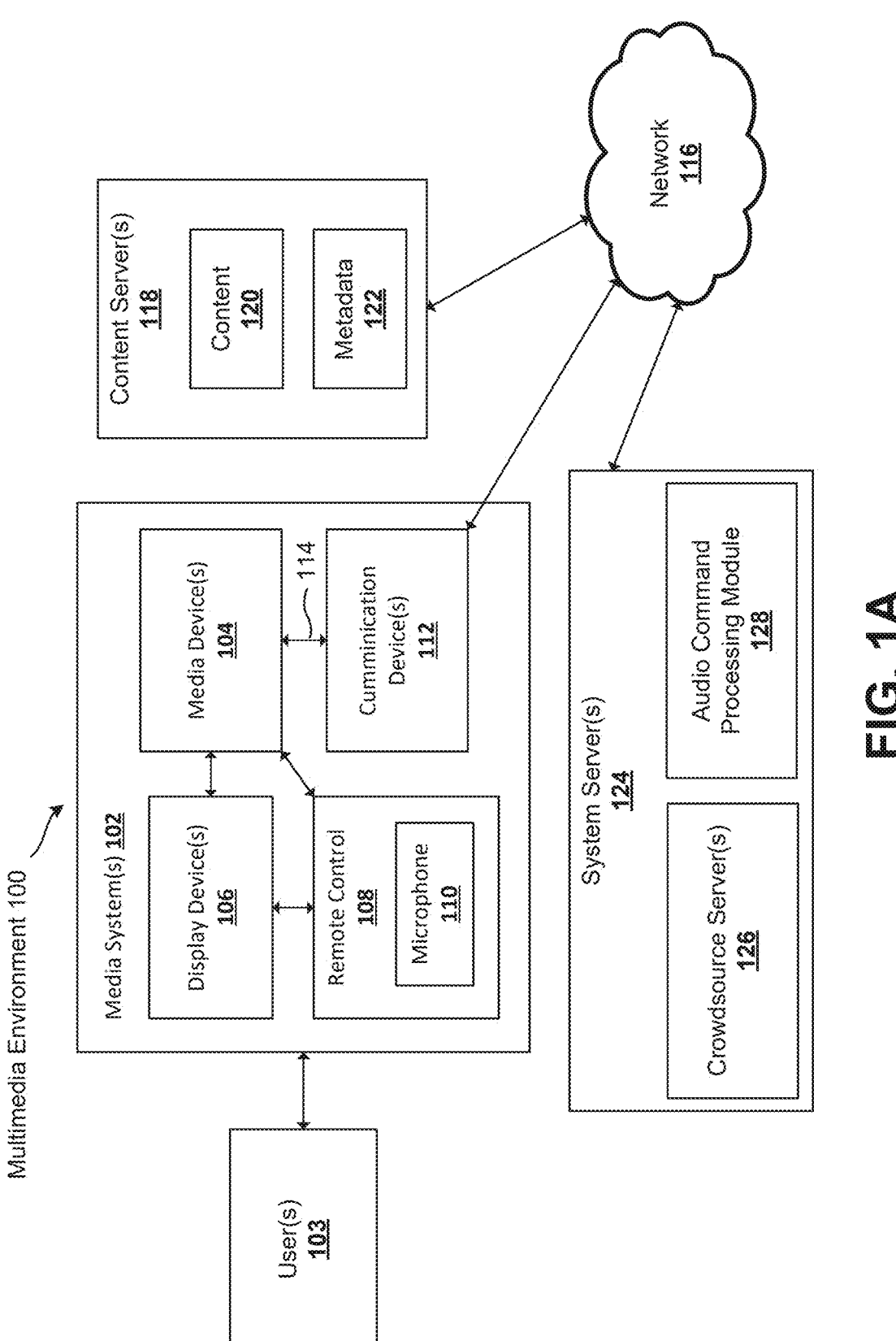
FIG. 1A depicts a block diagram of a multimedia environment, according to some embodiments.

FIG. 1A illustrates a block diagram of a multimedia environment 100, according to some embodiments. In a non-limiting example, multimedia environment 100 may be directed to streaming media. However, this disclosure is applicable to any type of media (instead of or in addition to streaming media), as well as any mechanism, means, protocol, method and/or process for distributing media.

The multimedia environment 100 may include one or more media systems 102. A media system 102 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 103 may operate with the media system 102 to select and consume content.

Each media system 102 may include one or more media devices 104 each coupled to one or more display devices 106. It is noted that terms such as "coupled," "connected to," "attached," "linked," "combined" and similar terms may refer to physical, electrical, magnetic, logical, etc., connections, unless otherwise specified herein.

Media device 104 may be a streaming media device, DVD or BLU-RAY device, audio/video playback device, cable box, and/or digital video recording device, to name just a few examples. Display device 106 may be a monitor, television (TV), computer, smart phone, tablet, wearable (such as a watch or glasses), appliance, internet of things (IoT) device, and/or projector, to name just a few examples. In some embodiments, media device 104 can be a part of, integrated with, operatively coupled to, and/or connected to its respective display device 106.

Each media device 104 may be configured to communicate with a network 116 via a communication device 112. The communication device 112 may include, for example, a cable modem or satellite TV transceiver. The media device 104 may communicate with the communication device 112 over a link 114, wherein the link 114 may include wireless (such as WiFi) and/or wired connections.

In various embodiments, the network 116 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 102 may include a remote control 108. The remote control 108 can be any component, part, apparatus and/or method for controlling the media device 104 and/or display device 106, such as a remote control, a tablet, laptop computer, smartphone, wearable, on-screen controls, integrated control buttons, audio controls, or any combination thereof, to name just a few examples. In an embodiment, the remote control 108 wirelessly communicates with the media device 104 and/or display device 106 using cellular, Bluetooth, infrared, etc., or any combination thereof. The remote control 108 may include a microphone 110, which is further described below.

The multimedia environment 100 may include a plurality of content servers 118 (also called content providers, channels, or sources). Although only one content server 118 is shown in FIG. 1, in practice the multimedia environment 100 may include any number of content servers 118. Each content server 118 may be configured to communicate with network 116.

Each content server 118 may store content 120 and metadata 122. Content 120 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 122 comprises data about content 120. For example, metadata 122 may include associated or ancillary information indicating or related to writer, director, producer, composer, artist, actor, summary, chapters, production, history, year, trailers, alternate versions, related content, applications, and/or any other information pertaining or relating to the content 120. Metadata 122 may also or alternatively include links to any such information pertaining or relating to the content 120. Metadata 122 may also or alternatively include one or more indexes of content 120, such as but not limited to a trick mode index.

The multimedia environment 100 may include one or more system servers 124. The system servers 124 may operate to support the media devices 104 from the cloud. It is noted that the structural and functional aspects of the system servers 124 may wholly or partially exist in the same or different ones of the system servers 124.

The media devices 104 may exist in thousands or millions of media systems 102. Accordingly, the media devices 104 may lend themselves to crowdsourcing embodiments and, thus, the system servers 124 may include one or more crowdsource servers 126.

For example, using information received from the media devices 104 in the thousands and millions of media systems 102, the crowdsource server(s) 126 may identify similarities and overlaps between closed captioning requests issued by different users 103 watching a particular movie. Based on such information, the crowdsource server(s) 126 may determine that turning closed captioning on may enhance users' 103 viewing experience at particular portions of the movie (for example, when the soundtrack of the movie is difficult to hear), and turning closed captioning off may enhance users' 103 viewing experience at other portions of the movie (for example, when displaying closed captioning obstructs critical visual aspects of the movie). Accordingly, the crowdsource server(s) 126 may operate to cause closed captioning to be automatically turned on and/or off during future streamings of the movie.

The system servers 124 may also include an audio command processing module 128. As noted above, the remote control 108 may include a microphone 110. The microphone 110 may receive audio data from users 103 (as well as other sources, such as the display device 106). In some embodiments, the media device 104 may be audio responsive, and the audio data may represent verbal commands from the user 103 to control the media device 104 as well as other components in the media system 102, such as the display device 106.

In some embodiments, the audio data received by the microphone 110 in the remote control 108 is transferred to the media device 104, which is then forwarded to the audio command processing module 128 in the system servers 124. The audio command processing module 128 may operate to process and analyze the received audio data to recognize the user's 103 verbal command. The audio command processing module 128 may then forward the verbal command back to the media device 104 for processing.

Figure 1B:
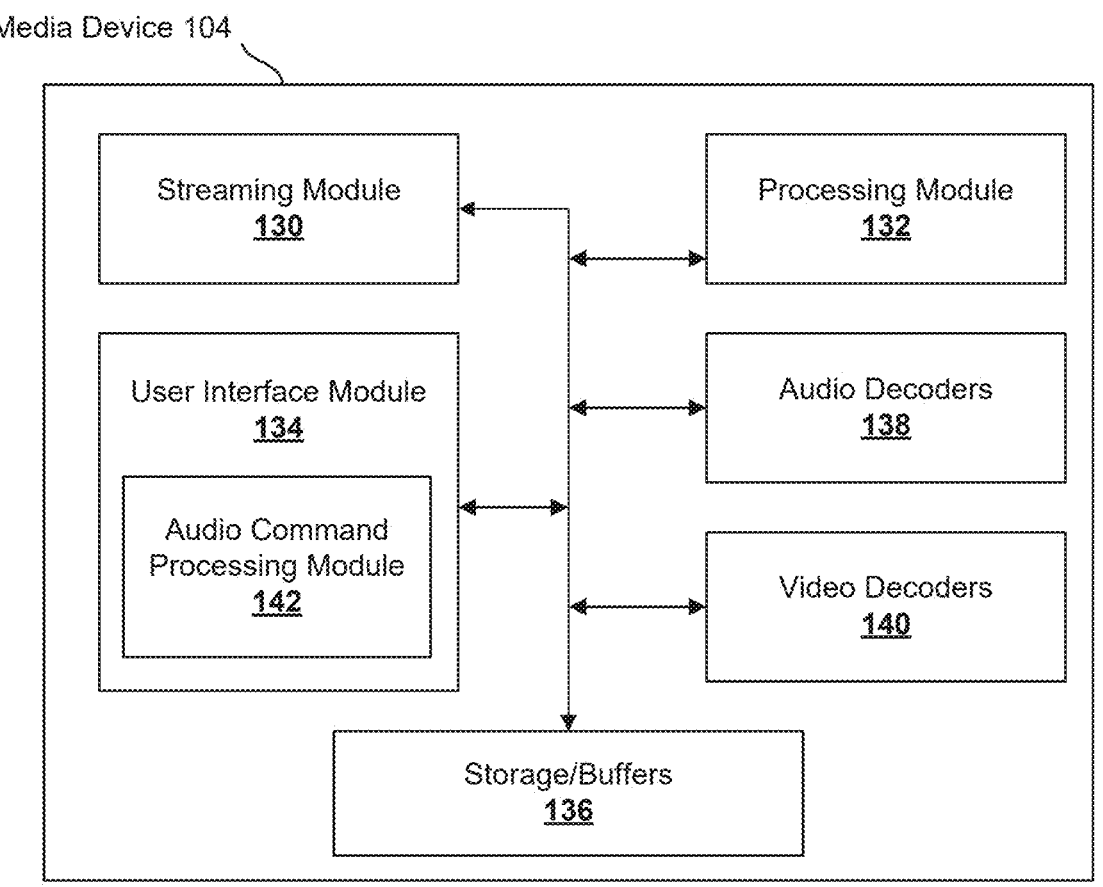
FIG. 1B depicts a block diagram of a media device, according to some embodiments.

In some embodiments, the audio data may be alternatively or additionally processed and analyzed by an audio command processing module 142 in the media device 104 (see FIG. 1B). The media device 104 and the system servers 124 may then cooperate to pick one of the verbal commands to process (either the verbal command recognized by the audio command processing module 128 in the system servers 124, or the verbal command recognized by the audio command processing module 142 in the media device 104).

FIG. 1B illustrates a block diagram of an example media device 104, according to some embodiments. Media device 104 may include a streaming module 130, processing module 132, storage/buffers 136, and a user interface module 134. As described above, the user interface module 134 may include the audio command processing module 142.

The media device 104 may also include one or more audio decoders 138 and one or more video decoders 140.

Each audio decoder 138 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 140 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 140 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1A and 1B, in some embodiments, the user 103 may interact with the media device 104 via, for example, the remote control 108. For example, the user 103 may use the remote control 108 to interact with the user interface module 134 of the media device 104 to select content, such as a movie, TV show, music, book, application, game, etc. The streaming module 130 of the media device 104 may request the selected content from the content server(s) 118 over the network 116. The content server(s) 118 may transmit the requested content to the streaming module 130. The media device 104 may transmit the received content to the display device 106 for playback to the user 103.

In streaming embodiments, the streaming module 130 may transmit the content to the display device 106 in real time or near real time as it receives such content from the content server(s) 118. In non-streaming embodiments, the media device 104 may store the content received from content server(s) 118 in storage/buffers 136 for later playback on display device 106.

Backlight Apparatus

Figure 2:
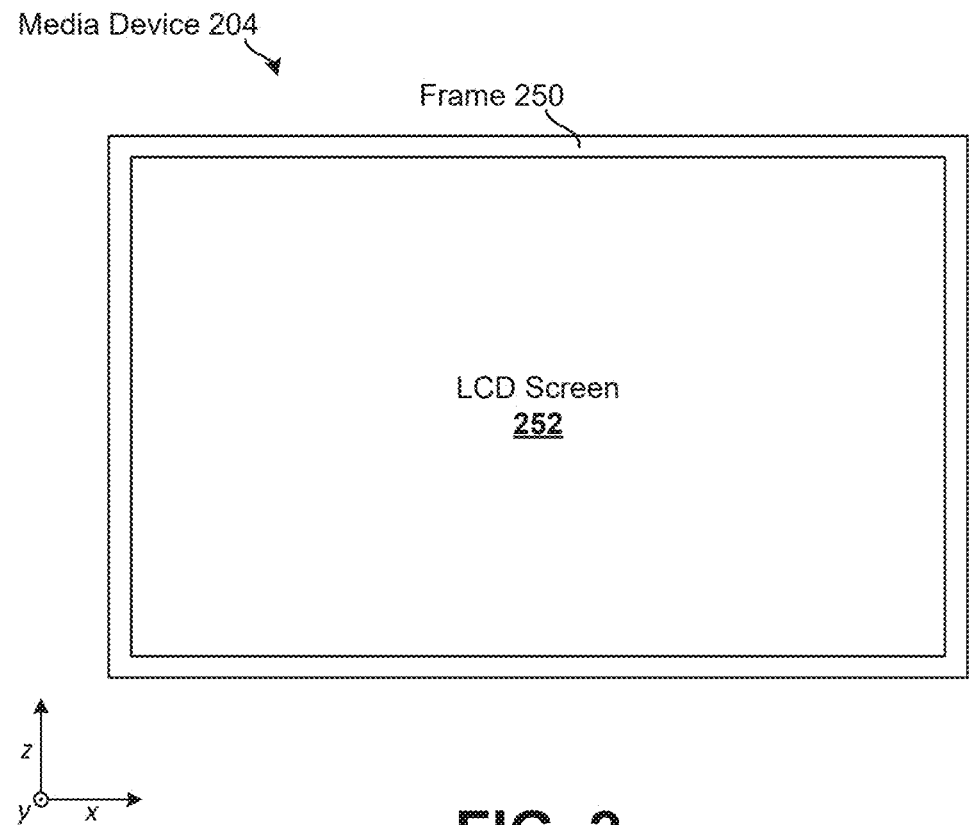
FIG. 2 depicts a front of a media device, according to some embodiments.

FIG. 2 depicts a front of a media device 204 according to some embodiments disclosed herein. The media device 204 can be the media device 104 of FIGS. 1A and 1B. In certain embodiments, the media device 204 can include a frame 250 and a display screen 252. In such embodiments, the frame 250 can be a housing that can support the display screen 252 and other components including graphics control boards, power distribution components, audio components, physical support, interface displays, backlight apparatuses, or the like. In some embodiments, the display screen 252 can be a liquid crystal display (LCD) screen that employs a backlight apparatus.

Figure 3:
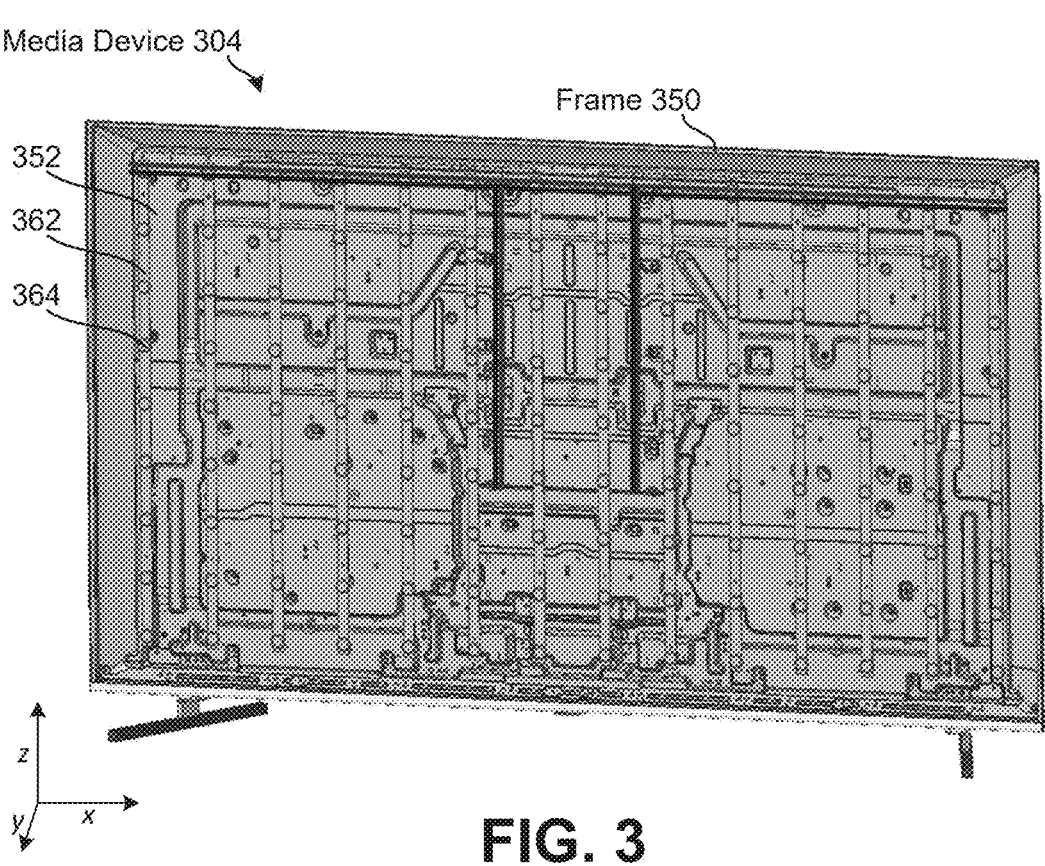
FIG. 3 depicts a media device backlight apparatus, according to some embodiments.

FIG. 3 depicts a media device 304 showing a backlight apparatus embedded within the frame 350, according to some embodiments. In some embodiments, the backlight apparatus can include light-emitting diode (LED) bar(s) 362. The LED bars 362 can be disposed adjacent to the display screen 352 in the y-axis direction, oriented vertically in the z-axis direction. In further embodiments, the media device 304 can include a quantity of LED bars 362 and/or driver ICs along the x-axis direction. In some embodiments, the quantity of LED bars can be determined as a function of a size of the display screen. For example, the media device 304 can include a plurality of LED bars 362 that corresponds to a diagonal dimension of the display screen 352. In some embodiments, the quantity of LED bars 362 disposed along the x-axis can be determined based on predetermined features of the LED bar 362, including, for example, LED type, local dimming requirements, media device 304 thickness, or the like. For example, a 55" screen can employ about 14 LED bars 362 across the horizontal axis (x-axis) of the media device 304. In some embodiments, the LED bars 362 can be disposed in a horizontal orientation where the quantity of LED bars 362 used in the media device 304 is disposed along the z-axis (e.g., in a vertical direction).

In some embodiments, the LED bars 362 can include at least one LED 364 and at least one driver IC (shown in detail below in, for example, FIGS. 5 and 7 and also referred to herein as IC device). In some embodiments, the LED bars 362 can include a plurality of LED bars 362. For example, each LED 364 can be configured to illuminate a predetermined area of the display screen 352. In some embodiments, each LED 364 can be configured to illuminate about 1% of the total area of the display screen 352.

Figures 4, 5:
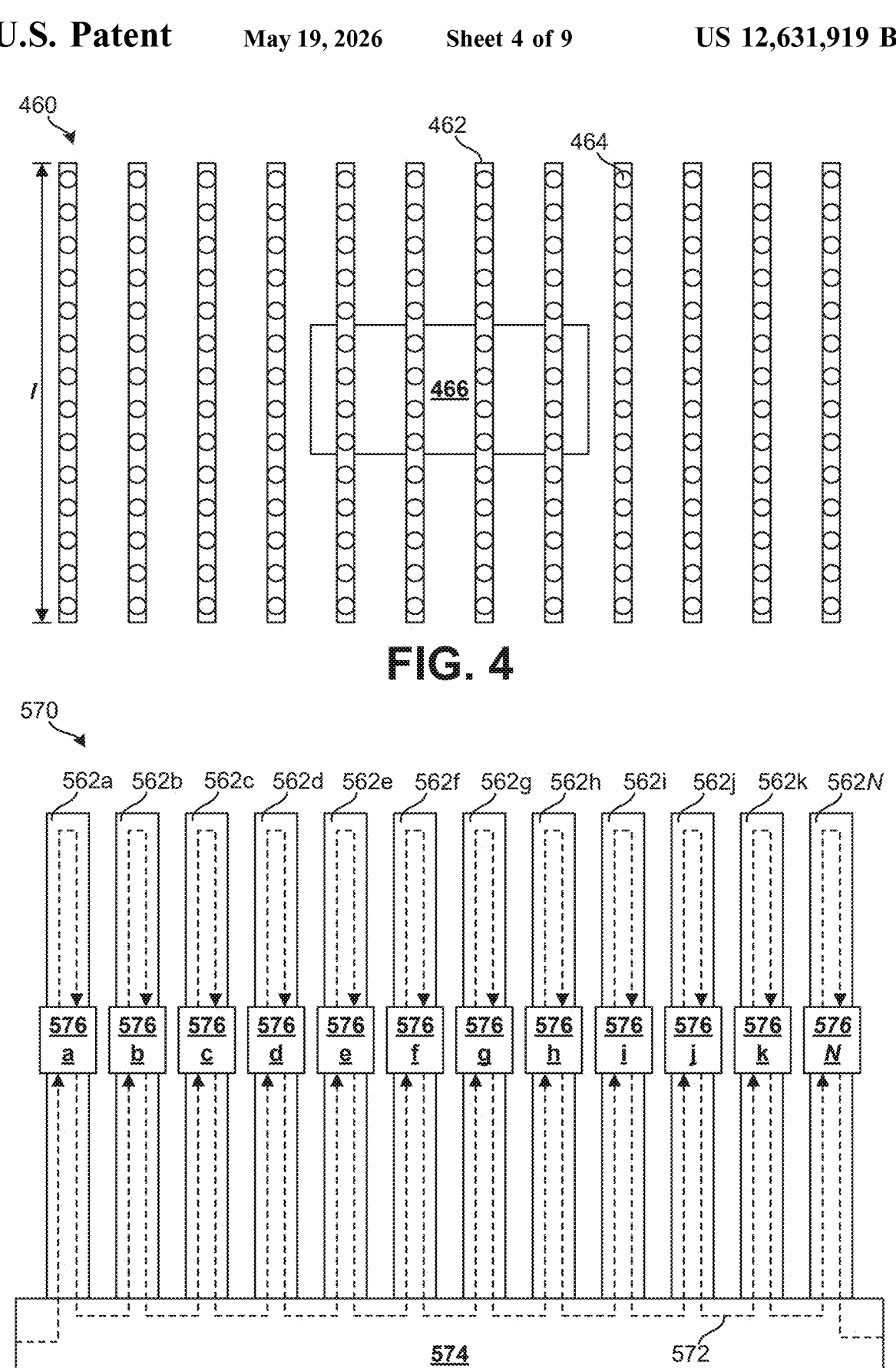
FIG. 4 depicts a media device backlight apparatus, according to some embodiments.
FIG. 5 depicts a media device backlight apparatus, according to some embodiments.

FIG. 4 depicts a media device backlight apparatus 460 according to various embodiments described herein. In some embodiments, the backlight apparatus 460 can include the LED bars 462. The LED bars 462 can include a plurality of LEDs 464 disposed along a length l of each LED bar 462. In some embodiments, The LED bar 462 can include a quantity of LEDs 464 and driver ICs disposed along the length l of the LED bar 462 that corresponds to the length l of each LED bar 462.

In some embodiments, a control circuit board 466 can be coupled to each LED bar 462 and configured to communicate control signals received from either the communication device(s) 112, the network 116, or any combination of input sources. In some embodiments, the control circuit board 466 can be communicably coupled to the video decoder(s) 140 (FIG. 1B) and configured to receive control signals from the video decoder(s) 140 and transmit command signals to each of the LEDs 464 and/or driver ICs disposed on the LED bars 462. In some embodiments, the command signals can include an activation/deactivation signal, a brightness control signal, and an activation time, including duration of activation, a predetermined brightness, the duration of the predetermined brightness, a brightness modulation, or any suitable command signal.

FIG. 5 depicts a media device backlight apparatus 570 according to various embodiments described herein. In some embodiments, the backlight apparatus 570 includes a plurality of LED bars 562a-562N that are coupled by a wiring circuit 572. In some embodiments, the wiring circuit 572 can include a driving voltage circuit, a data communications circuit, and a ground line. The driving voltage circuit, the data communication circuit, and the ground line can be coupled to the LED bars 562a-562N via a communications cable 574. In some embodiments, the communications cable 574 can connect to each LED bar 562a-562N along a single side of the media device 304. For example, each LED bar 562a-562N can be installed in the backlight apparatus 570 and/or the media device 304 such that each communications port (not shown) disposed on each LED bar 562a-562N is positioned along a same edge of the display screen 252 (FIG. 2).

In some embodiments, as shown in the example of FIG. 5, each communications port on each LED bar 562a-562N is positioned along the bottom of FIG. 5 and coupled to the communications cable 574. In some embodiments, where each LED bar is positioned having a similar orientation, the plurality of LED bars 562a-562N are installed symmetrically to one another. In some embodiments, each LED bar 562a-562N can include an integrated circuit (IC) device 576a-576N that is coupled to the LED bar 562a-562N to locally control each LED 464 (FIG. 4) on each LED bar 562a-562N. For example, the IC device 576a-576N can be communicably coupled to the data communication circuit embedded win the wiring circuit 572.

In some embodiments, the communications cable 574 can be a flat polymer cable (FPC). For example, the communications cable 574 can be a flat ribbon configured to house a data communication circuit, a driving voltage transmission circuit, and a ground line. In some embodiments, the communications cable 574 can include connectors configured to communicably couple the communications cable 574 to each LED bar 562a-562N via a communication port described below.

Figure 6:
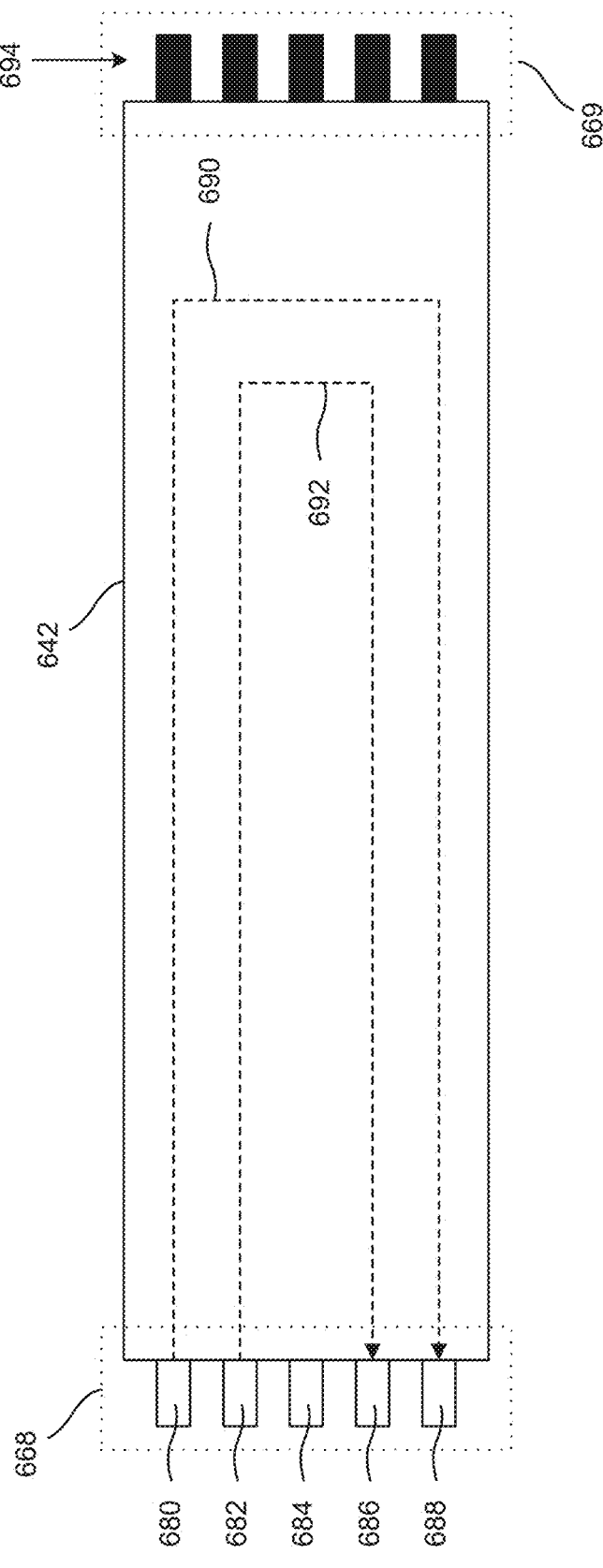
FIG. 6 depicts a light-emitting diode (LED) bar, according to some embodiments.

FIG. 6 depicts a light-emitting diode (LED) bar 642 according to various embodiments disclosed herein. In some embodiments, the LED bar 642 can include a communications port 668. The communications port can be configured to communicably couple the communications cable 574 (FIG. 5) to the wiring circuit 572. For example, the communications port 668 can include a data-in connection 680, a driving voltage input connection 682, a ground connection 684, a driving voltage output connection 686, and/or a data-out connection 688. In some embodiments, the data-in connection 680 and the data out connection 688 can be communicably coupled via communication wiring circuitry 690 embedded in the LED bar 642. In some embodiments, the IC device 576 (FIG. 5) can be communicably coupled to the communication wiring circuitry 690 embedded in the LED bar 642. Additionally, in some embodiments, the communication wiring circuitry 690 can be communicably coupled to each LED 464 (FIG. 4) disposed on each LED bar 642. Accordingly, the IC device 576 can receive control signals from the control circuit board 466 (FIG. 4) and/or the IC device 576 from the communications cable 574 via the communication wiring circuitry 690.

In some embodiments, the driving voltage input connection 682 and the driving voltage output connection 686 can be communicably coupled via driving voltage wiring circuitry 692 embedded in the LED bar 642. The driving voltage input connection 682 and the driving voltage wiring circuitry 692 can provide a voltage to each LED 464 (FIG. 4) disposed on the LED bar 642. In some embodiments, the driving voltage can range from about 0 VDC up to about 5 VDC.

Additionally, in some embodiments each IC device 576 (FIG. 5) disposed on each LED bar 642 can be communicably coupled to the driving voltage wiring circuitry 692. As such, the IC device 576 can control each LED 464 disposed on each LED bar 642. For example, when a particular LED 464 can be in an OFF condition (e.g., deactivated or non-energized), the IC device 576 can receive a control signal from the control circuit board 466 and transmit a driving voltage of 0 VDC to the particular LED. Likewise, when a particular LED 464 can be in an ON/FULL condition, the control circuit board 466 can transmit a command to the IC device 576 to transmit a driving voltage of 5 VDC to the particular LED 464. In some embodiments, variations in activation and brightness can be controlled by modulating the driving voltage transmitted to the LED 464. For example, a brightness gradient can be provided by transmitting 0 VDC to a first LED 464, 1 VDC to a second LED 464, 2 VDC to a third LED 464, 3 VDC to a fourth LED 464, 4 VDC to a fifth LED 464, and 5 VDC to a sixth LED 464. In some embodiments, the control circuit board can include an active matrix (AM) driving module configured to control each LED 464 on each LED bar 642 according to video signals received from the video decoder(s) 140, the communication device(s) 112, and/or the network 116 (FIGS. 1A and 1B). For example, the AM driving module can transmit control signals to each IC device 576 disposed on each LED bar 642 and each IC device 576 can transmit control signals to each LED 464 disposed on each LED bar 642.

In some additional embodiments, the LED bar 642 can include a power port 669 disposed at an end of the LED bar 642 that is distal from the communications port 668. The power port 669 can be configured to include at least one power connection 694, and can be configured to include a plurality of power connections 694 based on the LED bar 642 configuration. In some examples, the power connections 694 and a connected power cable can be configured to deliver a 48 VDC power source to the LED bar 642 (e.g., to provide power to the IC device 576). In some embodiments, the power cable can provide power to the control circuit board 466. In some embodiments, the power cable is configured to carry power from an external power source to the backlight apparatus 570 (FIG. 5).

Figure 7:
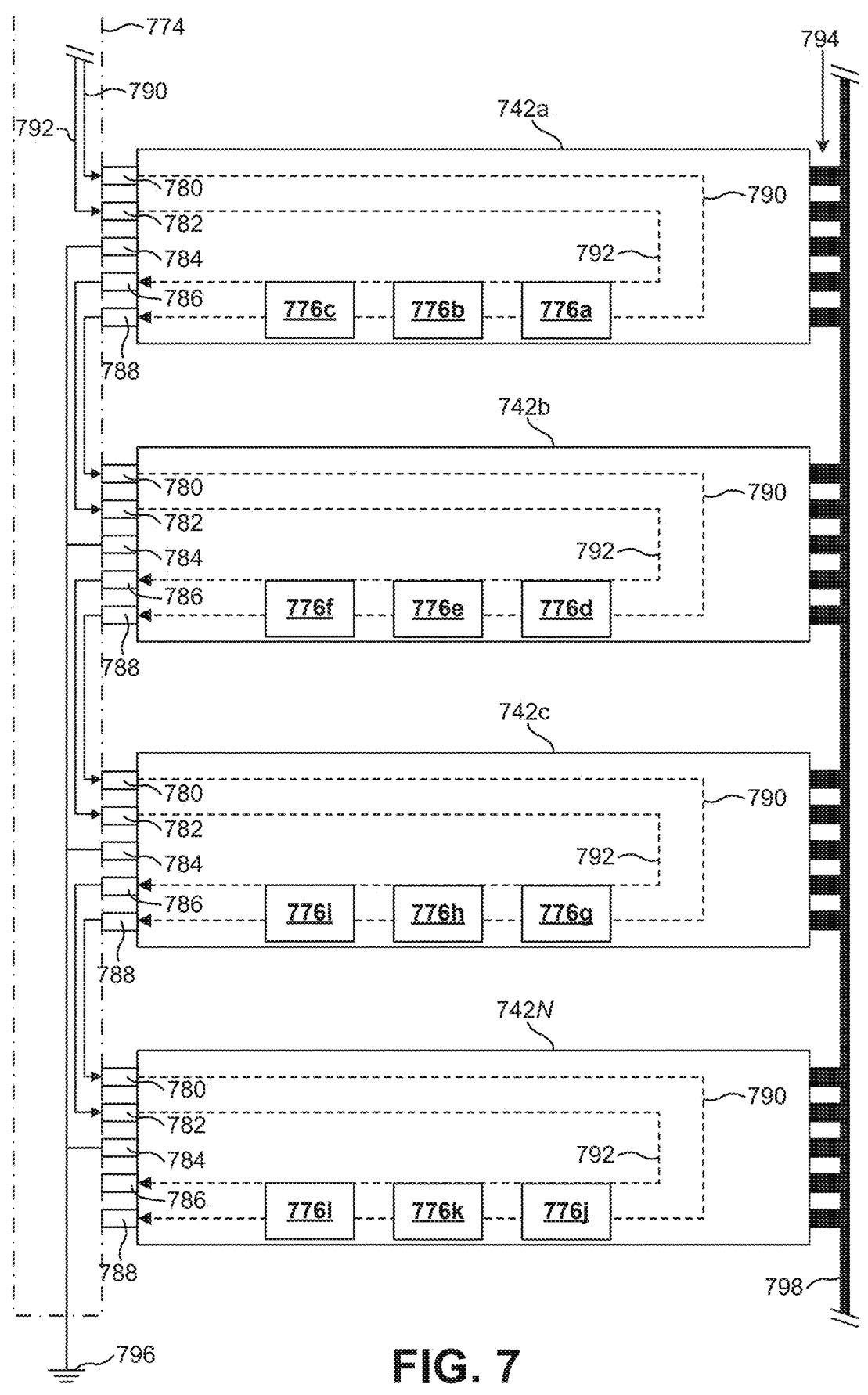
FIG. 7 depicts a media device backlight apparatus, according to some embodiments.

FIG. 7 depicts a media device backlight apparatus according to various embodiments described herein. FIG. 7 depicts a plurality of LED bars 742a, 742b, 742c, and 742N disposed in the aforementioned symmetrical orientation and communicably coupled in a daisy-chain configuration. In some embodiments, the communications cable 774 can be positioned along a proximal end of the plurality of LED bars 742a-742N (e.g., on the left side in the example of FIG. 7) and configured to provide the daisy-chain coupling configuration. For example, the communications cable 774 can include the communication wiring circuitry 790, the driving voltage wiring circuitry 792, and a ground line 796.

In some embodiments, data can be transmitted along the communication wiring circuitry 790 and into the first LED bar 742a via the data-in connection 780. The data can flow along the communication wiring circuitry 790 embedded in the first LED bar 742a to any IC device 776 disposed on the first LED bar 742a. For example, data can flow into IC device 776a and IC device 776a can receive commands intended to be disseminated by IC device 776a. IC device 776a can then allow the data to continue to flow to IC device 776b. IC device 776b can then extract data intended for IC device 776b and allow data to continue to flow to IC device 776c. IC device 776c can extract data intended for IC device 776c and then allow the data to continue to the data-out connection 788. The data can continue to the second LED bar 742b in the backlight apparatus 570 (FIG. 5).

In some embodiments, the driving voltage (e.g., up to about 5 VDC) can be transmitted along the driving voltage wiring circuitry 792 and into the first LED bar 742a via the driving voltage input connection 782. The driving voltage can flow along the driving voltage wiring circuitry 792 embedded in the first LED bar 742a to any IC device 776 disposed on the first LED bar 742a. For example, the driving voltage can flow into any IC device 776. The IC device 776 can then disseminate the driving voltage to a particular LED 464 (FIG. 4) on the first LED bar 742a. As described above, the driving voltage disseminated to a particular LED 464 can vary by time and/or intensity based on data received from the video decoder(s) 140, the communication device(s) 112, and/or the network 116.

In some embodiments, the driving voltage can further be transmitted to the driving voltage output connection 786. For example, the driving voltage can be transmitted from the driving voltage output connection 786 of the first LED bar 742a to the driving voltage wiring circuitry 792 that is positioned between the first LED bar 742a and the second LED bar 742b, and into the driving voltage input connection of the second LED bar 742b. In some embodiments, such as in the example of FIG. 7, the driving voltage input connection 782 and driving voltage output connection 786 of the first LED bar 742a can be disposed on the proximal end of both the first LED bar 742a and the second LED bar 742b. In some embodiments, such a configuration reduces the amount of wiring in the media device 304. In additional embodiments, such a configuration can facilitate manufacturing of the media device 304.

In some embodiments, each LED bar 742a-742N can be connected to a ground line 796 via the ground connection 784.

In some embodiments, a power port 669 (FIG. 6) and/or a power connection 794 can be disposed on the distal end of the LED bars 742a-742N (e.g., the right side in the example of FIG. 7). For example, one or more power connections 794 can be coupled to a power cable 798. Power from the power cable 798 can be used to energize the backlight apparatus 570 (FIG. 5), including each LED bar 742a-742N and the control circuit board 466 (FIG. 4). In some embodiments, the power cable 798 can provide power to other electronics embedded in the media device 304.

In some embodiments, for example during a manufacturing process, LED bars 742a-742N having the communications port 668 positioned at a proximal end of the LED bars 742a-742N and the power port 669 positioned at the distal end of the LED bars 742a-742N can provide a facilitated manufacturing process in which each LED bar 742a-742N can be positioned symmetrically, having the same orientation and reduce the risk of connecting the power source (e.g., up to 48 VDC) to a driving voltage input connection configured to transmit a lower voltage (e.g., up to 5 VDC) and damaging the LED bars 742a-742N upon energizing.

Example Computer System

Figure 8:
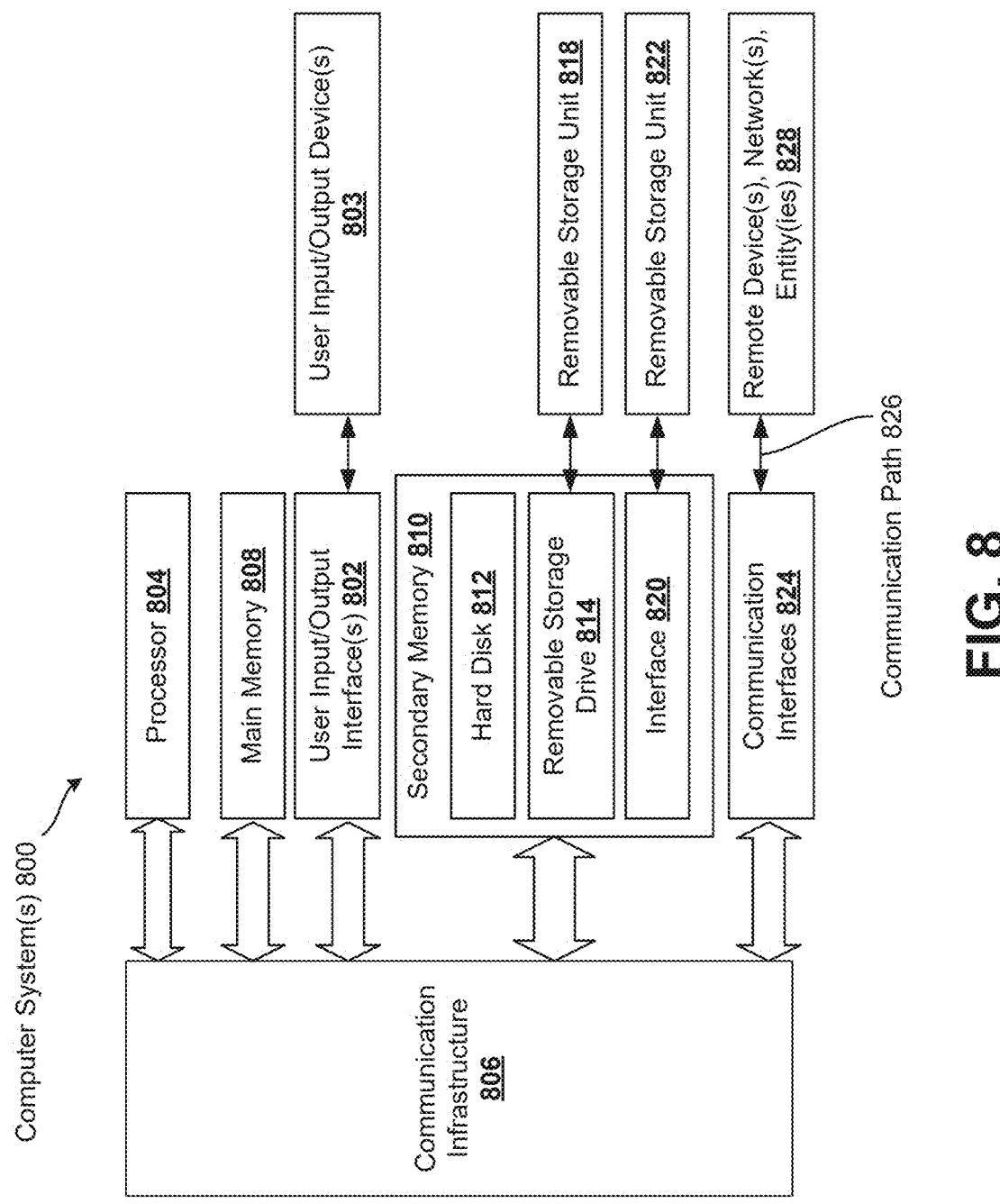
FIG. 8 is a block diagram of a computer system that can be used for implementing various embodiments.

Various embodiments may be implemented, for example, using one or more well-known computer systems, such as a computer system 800 shown in FIG. 8. For example, the media device 104 may be implemented using combinations or sub-combinations of the computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure (or bus) 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

FIG. 9 is a flowchart for a method of manufacturing a backlight apparatus according to various embodiments. The method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

The method 900 shall be described with reference to FIGS. 2 through 7. However, the method 900 is not limited to that example embodiment.

In operation 910, a first LED bar (e.g., the LED bar 742) can be disposed adjacent to a display screen (e.g., the display screen 352). The LED bar 742 can be positioned in any orientation with respect to a bottom edge of the display screen 352. For example, the LED bar 742 can be oriented substantially vertically, substantially horizontally, diagonally, concentrically elliptically, or the like. In some embodiments, the LED bar 742 can be positioned such that a communications port (e.g., the communications port 668) is positioned proximal to the bottom of the display screen 352 and/or the media device 304, and a power port (e.g., the power port 669) is positioned at the end of the LED bar 742 distal from the bottom of the display screen 352.

In operation 920, at least a second LED bar (e.g., a second LED bar 742) can be disposed adjacent to the display screen 352. In some embodiments, the at least second LED bar 742 is positioned substantially parallel to the first LED bar 742 and in the same orientation as the first LED bar 742 (e.g., such that the communications port 668 of the at least second LED bar 742 is proximal to the bottom of the display screen 352 and the power port of the at least second LED bar 742 is distal from the bottom of the display screen 352).

In operation 930, a communications cable (e.g., the communications cable 774 in the example of FIG. 7) can be positioned adjacent to the proximal end of each LED bar 742. For example, the communications cable 774 can include a pin connector configured to communicably couple the wiring circuitry in the communications cable 774 to the wiring circuitry embedded in each LED bar. For example, the communications cable 774 can be communicably coupled to the data-in connection 780, the driving voltage input connection 782, the ground connection 784, the driving voltage output connection 786, and/or the data-out connection 788.

In some embodiments, the communications cable 774 can be configured to connect to a first data-in connection 780, a first driving voltage input connection 782, and a ground connection 784. In additional embodiments, the communications cable 774 can be configured to connect to a first driving voltage output connection 786 and a first data-out connection 788 of the first LED bar 742 and connect the first driving voltage output connection 786 and the first data-out connection 788 of the first LED bar 742 to a second data-in connection 780 and a second driving voltage input connection 782 of a second LED bar 742, respectively.

In additional embodiments, the communications cable 774 can be configured to connect to a second driving voltage output connection 786 and a second data-out connection 780 of the second LED bar 742 and connect the second driving voltage output connection 786 and the second data-out connection 780 of the second LED bar 742 to a third data-in connection 780 and a third driving voltage input connection 782 of a third LED bar 742, respectively. In some embodiments, this operation 930 can be performed repeatedly as determined by a predetermined number of LED bars for the size of the media device 304.

In operation 940, the communications cable can be connected to a control source, for example, the control circuit board 466.

In operation 950, a power cable (e.g., the power cable 798) can be positioned adjacent to the distal end of each LED bar 742.

In operation 960, the power cable can be communicably coupled to at least one power connection 794. In some cases, the power cable 798 can be connected to a plurality of power connections 794. In some embodiments, the power cable 798 can be communicably coupled to the control source, for example, the control circuit board 466.

In operation 970, the power cable 798 can be communicably coupled to a power-in port disposed within the media device 304. The power-in port can be configured to receive power from an external source (e.g., a wall outlet, a generator, an AC adapter, or the like) and supply power to components within the media device 304.

FIG. 10 is a flowchart for a method of manufacturing a backlight apparatus according to various embodiments. The method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

The method 1000 shall be described with reference to FIGS. 2 through 7. However, the method 1000 is not limited to that example embodiment.

In operation 1010, a first LED bar (e.g., the LED bar 742) can be disposed adjacent to a display screen (e.g., the display screen 352). The LED bar 742 can be positioned in any orientation with respect to a bottom edge of the display screen 352. For example, the LED bar 742 can be oriented substantially vertically, substantially horizontally, diagonally, concentrically elliptically, or the like. In some embodiments, the LED bar 742 can be positioned such that a communications port (e.g., the communications port 668) is positioned proximal to the bottom of the display screen 352 and/or the media device 304, and a power port (e.g., the power port 669) is positioned at the end of the LED bar 742 distal from the bottom of the display screen 352.

In operation 1020, at least a second LED bar (e.g., a second LED bar 742) can be disposed adjacent to the display screen 352. In some embodiments, the at least second LED bar 742 is positioned substantially parallel to the first LED bar 742 and in the same orientation as the first LED bar 742 (e.g., such that the communications port 668 of the at least second LED bar 742 is proximal to the bottom of the display screen 352 and the power port of the at least second LED bar 742 is distal from the bottom of the display screen 352).

In operation 1030, a communications cable (e.g., the communications cable 774 in the example of FIG. 7) can be positioned adjacent to the proximal end of each LED bar 742. For example, the communications cable 774 can include a pin connector configured to communicably couple the wiring circuitry in the communications cable 774 to the wiring circuitry embedded in each LED bar. For example, the communications cable 774 can be communicably coupled to the data-in connection 780, the driving voltage input connection 782, the ground connection 784, the driving voltage output connection 786, and/or the data-out connection 788.

In some embodiments, the communications cable 774 can be configured to connect to a first data-in connection 780, a first driving voltage input connection 782, and a ground connection 784. In additional embodiments, the communications cable 774 can be configured to connect to a first driving voltage output connection 786 and a first data-out connection 788 of the first LED bar 742 and connect the first driving voltage output connection 786 and the first data-out connection 788 of the first LED bar 742 to a second data-in connection 780 and a second driving voltage input connection 782 of a second LED bar 742, respectively.

In additional embodiments, the communications cable 774 can be configured to connect to a second driving voltage output connection 786 and a second data-out connection 780 of the second LED bar 742 and connect the second driving voltage output connection 786 and the second data-out connection 780 of the second LED bar 742 to a third data-in connection 780 and a third driving voltage input connection 782 of a third LED bar 742, respectively. In some embodiments, this operation 930 can be performed repeatedly as determined by a predetermined number of LED bars for the size of the media device 304.

In operation 1040, the power cable can be communicably coupled to at least one power connection 794 or a power port (e.g., the power port 669 as in the example of FIG. 6). In some cases, the power cable 798 can be connected to a plurality of power connections 794. In some embodiments, the power cable 798 can be communicably coupled to the control source, for example, the control circuit board 466.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising:

a display screen; and a backlight apparatus, comprising:

a first light-emitting diode (LED) bar comprising a first communications port disposed at a proximal end of the first LED bar and a first power port disposed at a distal end of the first LED bar, wherein the first LED bar further comprises a first integrated circuit (IC) control device disposed on the first LED bar, and wherein the first communications port comprises a first data-in connection, a first data-out connection, a first driving voltage input connection, and a first driving voltage output connection;

a second LED bar disposed substantially parallel to the first LED bar, wherein the second LED bar comprises a second communications port disposed at a proximal end of the second LED bar and a second power port disposed at a distal end of the second LED bar, wherein the first LED bar and the second LED bar are disposed in a similar orientation, wherein the second LED bar further comprises a second IC control device disposed on the second LED bar, and wherein the second communications port comprises a second data-in connection, a second data-out connection, a second driving voltage input connection, and a second driving voltage output connection;

a power cable coupled to the first power port and the second power port;

a communications cable coupled to the first communications port and the second communications port; and a control circuit board coupled to the communications cable, wherein the first and second data-in connections, the first and second data-out connections, the first and second driving voltage input connections, and the first and second driving voltage output connections are all located at a same end of the first and second LED bars.

2. The media device of claim 1, wherein the first communications port further comprises a first ground connection and the second communications port further comprises a second ground connection.

3. The media device of claim 1, wherein the second data-in connection and the first data-out connection are coupled using a data transmission circuitry embedded within the first LED bar and the second LED bar.

4. The media device of claim 1, wherein the second driving voltage input connection and the first driving voltage output connection are coupled using electrical transmission circuitry embedded within the first LED bar and the second LED bar.

5. The media device of claim 1, wherein the second data-in connection and the first data-out connection are coupled using a data transmission circuitry embedded within the first LED bar and the second LED bar, and wherein the first IC control device and the second IC control device are coupled to the data transmission circuitry.

6. The media device of claim 5, wherein at least one of the first IC control device or the second IC control device comprises an active matrix (AM) display driver.

7. The media device of claim 1, wherein the backlight apparatus further comprises a plurality of LED bars comprising a quantity of LED bars determined as a function of a size of the display screen.

8. The media device of claim 7, wherein the plurality of LED bars are disposed having their respective communications ports on a respective proximal end of each LED bar of the plurality of LED bars and their respective power ports on a respective distal end of each LED bar of the plurality of LED bars from the communications cable.

9. The media device of claim 1, wherein the communications cable comprises a flat polymer cable.

10. The media device of claim 9, wherein the flat polymer cable comprises a first data transmission line, a first driving voltage line, a ground line, a second driving voltage line, and a second data transmission line.

11. A backlight apparatus, comprising:

a first light-emitting diode (LED) bar comprising a first communications port disposed at a proximal end of the first LED bar and a first power port disposed at a distal end of the first LED bar, wherein the first LED bar further comprises a first integrated circuit (IC) control device disposed on the first LED bar, and wherein the first communications port comprises a first data-in connection, a first data-out connection, a first driving voltage input connection, and a first driving voltage output connection; and a second LED bar disposed substantially parallel to the first LED bar, wherein the second LED bar comprises a second communications port disposed at a proximal end of the second LED bar and a second power port disposed at a distal end of the second LED bar, wherein the first LED bar and the second LED bar are disposed in a similar orientation, wherein the second LED bar further comprises a second IC control device disposed on the second LED bar, wherein the second communications port comprises a second data-in connection, a second data-out connection, a second driving voltage input connection, and a second driving voltage output connection, and wherein the first and second data-in connections, the first and second data-out connections, the first and second driving voltage input connections, and the first and second driving voltage output connections are all located at a same end of the first and second LED bars.

12. The backlight apparatus of claim 11, further comprising a power cable coupled to the first power port and the second power port, wherein the first power port of the first LED bar is located at a same side as the second power port of the second LED bar.

13. The backlight apparatus of claim 11, further comprising a communications cable coupled to the first communications port and the second communications port.

14. The backlight apparatus of claim 13, further comprising a control circuit board coupled to the communications cable.

15. A method of manufacturing a media device, comprising:

disposing a first light-emitting diode (LED) bar adjacent to a first portion of a display screen in a first orientation;

disposing a first integrated circuit (IC) control device on the first LED bar;

disposing a second LED bar adjacent to a second portion of the display screen in the first orientation and substantially parallel to the first LED bar, wherein the first LED bar and the second LED bar are separated by a predetermined distance;

disposing a second IC control device on the second LED bar;

disposing a communications cable adjacent to a proximal end of the first LED bar and a proximal end of the second LED bar, wherein the communications cable is coupled to a first communications port disposed at the proximal end of the first LED bar and a second communications port disposed at the proximal end of the second LED bar;

connecting the communications cable to a control source;

disposing a power cable adjacent to a distal end of the first LED bar and a distal end of the second LED bar, wherein the power cable is coupled to a first power port disposed at the distal end of the first LED bar and a second power port disposed on the distal end of the second LED bar;

connecting the power cable to the control source; and connecting the power cable to a power-in port disposed on the media device, wherein the first communications port comprises a first data-in connection, a first data-out connection, a first driving voltage input connection, and a first driving voltage output connection, wherein the second communications port comprises a second data-in connection, a second data-out connection, a second driving voltage input connection, and a second driving voltage output connection, and wherein the first and second data-in connections, the first and second data-out connections, the first and second driving voltage input connections, and the first and second driving voltage output connections are all located at a same end of the first and second LED bars.

16. The method of claim 15, wherein the first power port of the first LED bar is located at a same side as the second power port of the second LED bar.

17. The method of claim 15, further comprising connecting the first IC control device to the communications cable using a communications circuit embedded within the first LED bar and the second LED bar.

18. The method of claim 17, further comprising connecting the first IC control device to a first LED on the first LED bar and to a first LED on the second LED bar.

19. The method of claim 18, further comprising controlling an activation, a brightness, and an activation time of the first LED on the first LED bar and the first LED on the second LED bar using an active matrix driver embedded in the control source coupled to the communications cable coupled to the first LED bar.

20. The method of claim 15, further comprising connecting the first LED bar or the second LED bar to a ground.

* * * * *